(12) United States Patent
Gerty et al.

(10) Patent No.: US 11,787,280 B2
(45) Date of Patent: *Oct. 17, 2023

(54) SYSTEMS AND METHODS FOR REDUCING EFFICIENCY LOSSES ASSOCIATED WITH POWERING VEHICLE ACCESSORIES

(71) Applicant: PACCAR Inc., Bellevue, WA (US)

(72) Inventors: Michael D. Gerty, Bellingham, WA (US); Constantin Emil Nedelcu, Bellingham, WA (US); Uday Vadlamani, Burlington, WA (US); Iner Martin Jorgensen, Renton, WA (US); Mark G. Malowicki, Anacortes, WA (US)

(73) Assignee: PACCAR Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,015

(22) Filed: Jun. 6, 2022

(65) Prior Publication Data
US 2022/0402347 A1 Dec. 22, 2022

Related U.S. Application Data

(63) Continuation of application No. 16/798,105, filed on Feb. 21, 2020, now Pat. No. 11,351,854.

(51) Int. Cl.
*B60K 6/26* (2007.10)
*B60K 17/28* (2006.01)
*B60K 25/00* (2006.01)

(52) U.S. Cl.
CPC .............. *B60K 6/26* (2013.01); *B60K 17/28* (2013.01); *B60K 2025/005* (2013.01)

(58) Field of Classification Search
CPC .... B60K 6/26; B60K 17/28; B60K 2025/005; B60K 17/02; B60K 25/00; Y02T 10/92
See application file for complete search history.

(56) References Cited

U.S. PATENT DOCUMENTS 11,084,373 B2    8/2021  Fortune
11,349,331 B2 *  5/2022  Stoltz ................. B60K 25/06
(Continued)

FOREIGN PATENT DOCUMENTS

CA        3046781       6/2018
JP        3584680       11/2004
JP      2022171215 A  * 11/2022 ............. B60C 27/02

*Primary Examiner* — Justin Holmes
(74) *Attorney, Agent, or Firm* — Merchant & Gould P.C.

(57) ABSTRACT

Systems and methods for driving an accessory of a vehicle. The system includes a power take-off (PTO) device, a mechanically driven accessory, a battery, and power conversion circuitry electrically connected to the battery. The system also includes a first electric motor mechanically coupled to the PTO device and a second electric motor mechanically coupled to the mechanically driven accessory. The system further includes an engageable mechanical connector that, when engaged, mechanically couples the PTO device and the mechanically driven accessory. The system performs operations including engaging the engageable mechanical connector when a speed of the PTO device is within a predetermined speed range; disengaging the engageable mechanical connector when the speed of the PTO device is outside the predetermined speed range; and based on disengaging the engageable mechanical connector, providing electric power to the second electric motor to generate and transfer mechanical energy to the mechanically driven accessory.

20 Claims, 12 Drawing Sheets

(56) References Cited

U.S. PATENT DOCUMENTS

| | | | |
|---|---|---|---|
| 11,351,854 B2 * | 6/2022 | Gerty | B60K 17/28 |
| 11,541,863 B2 * | 1/2023 | Shively | B60W 10/08 |
| 2020/0247239 A1 | 8/2020 | Stoltz | |
| 2022/0219530 A1 * | 7/2022 | Stoltz | B60W 30/1888 |

* cited by examiner

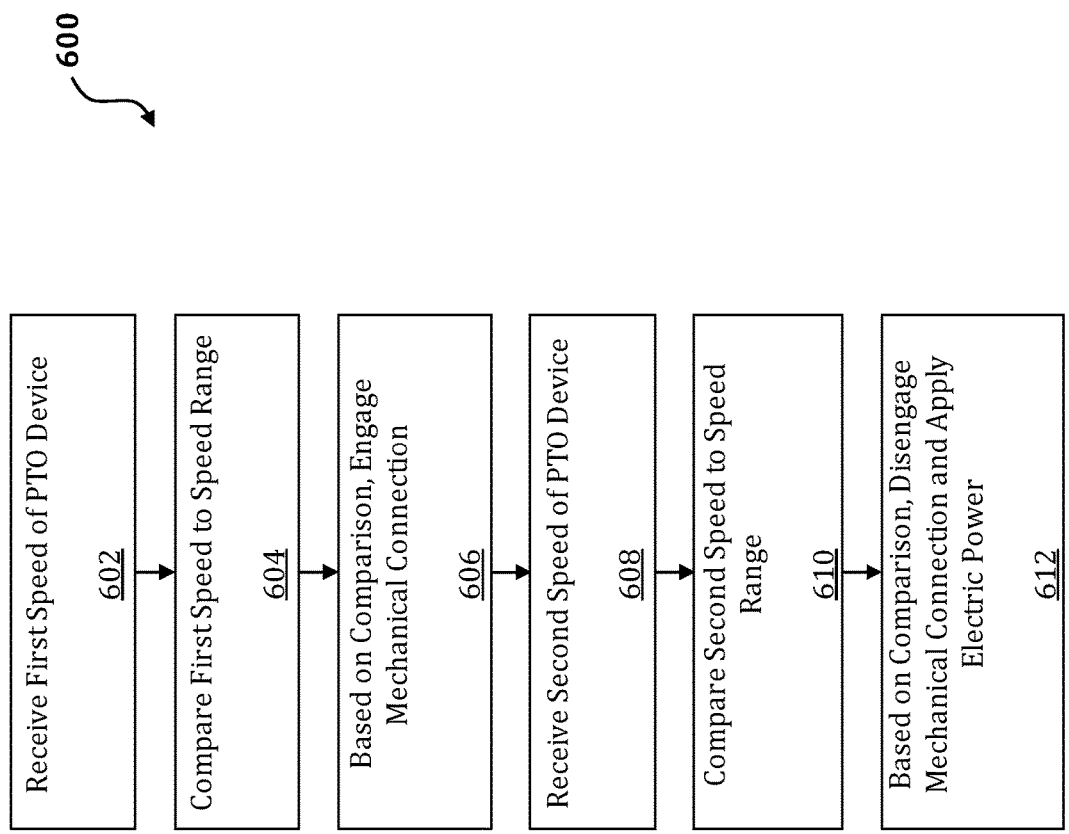

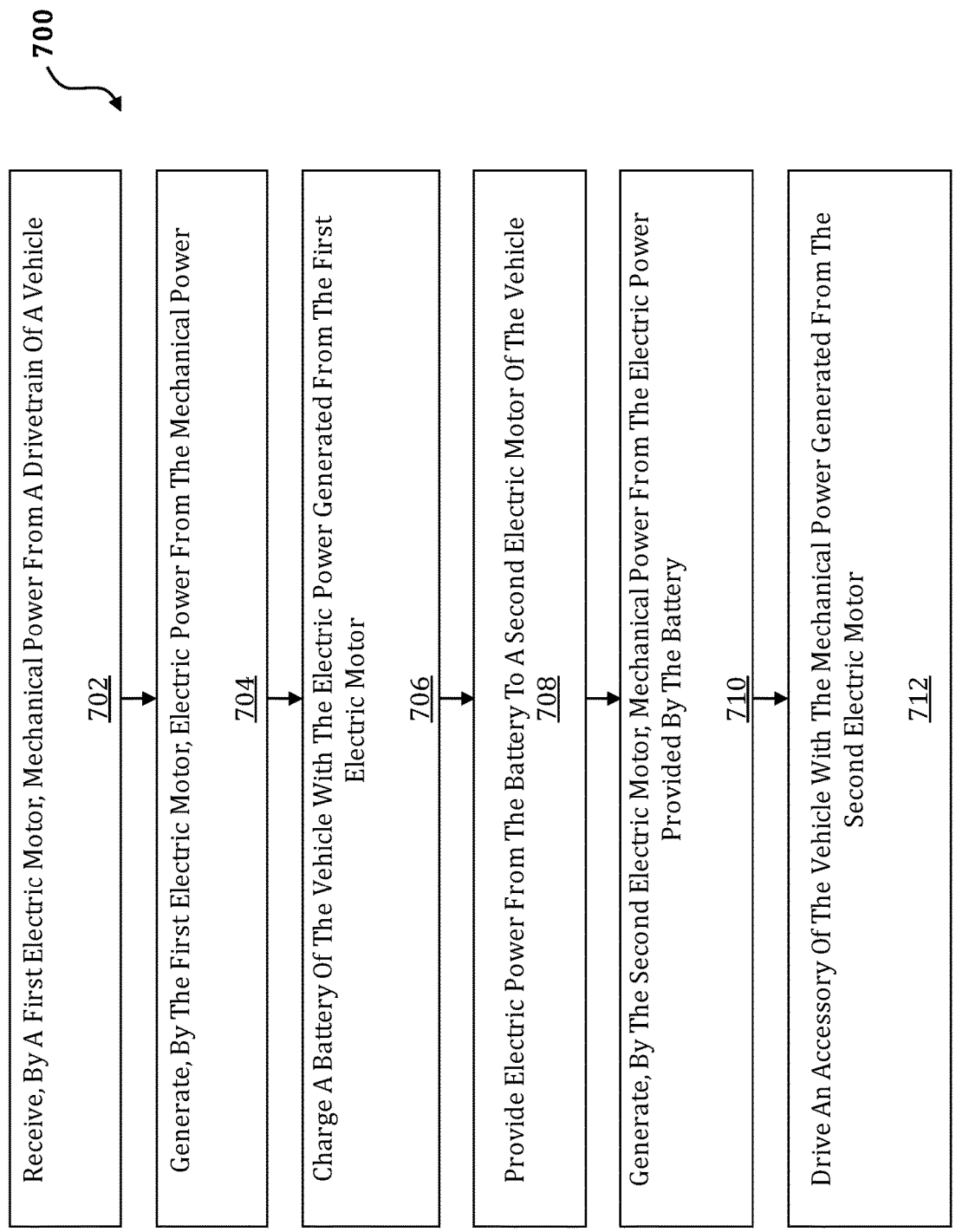

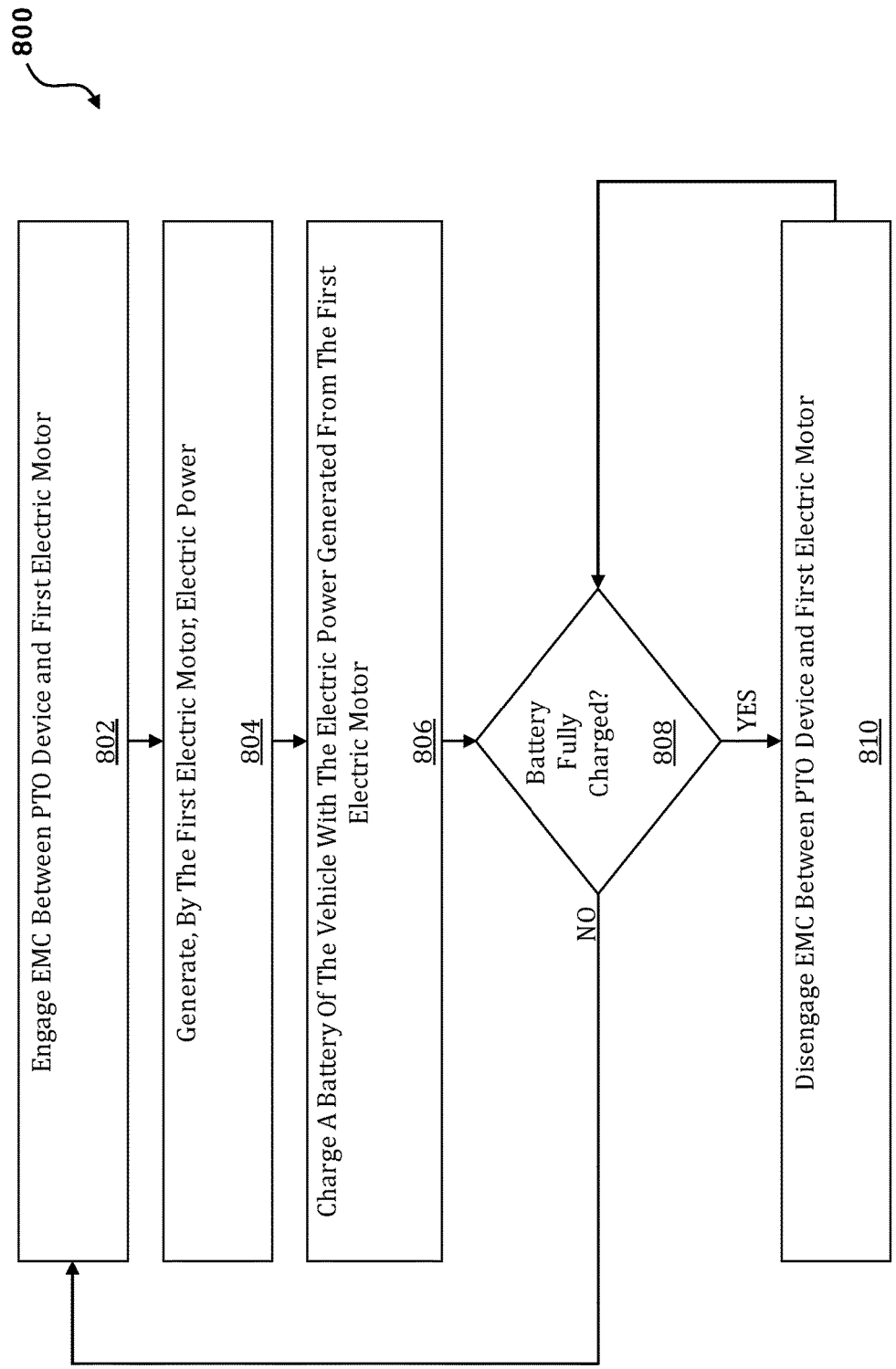

`US 11,787,280 B2`

SYSTEMS AND METHODS FOR REDUCING EFFICIENCY LOSSES ASSOCIATED WITH POWERING VEHICLE ACCESSORIES

CROSS REFERENCE TO RELATED APPLICATIONS

This application is a continuation of application Ser. No. 16/798,105, filed Feb. 21, 2020, now U.S. Pat. No. 11,351,854, which application is incorporated herein by reference in its entirety.

BACKGROUND

Vehicles often have accessories incorporated into the vehicle or accessories that may be attached and powered by the vehicle. One common example of such an accessory is refrigerant compressor as part of a heating, ventilation, and air conditioning ("HVAC") system that may be used to cool or heat the interior of the vehicle when the vehicle is in operation or even when the vehicle is not in operation. In some vehicles, a sleeping compartment ("sleeper") may be attached to a cabin. The driver may rest or sleep in the sleeper either while the second driver operates the truck or when the truck is parked, for example, for the night, during mandatory rest periods, etc. These rest periods in the sleeper are referred to as "hoteling" in the trucking industry. When a driver is hoteling, accessories such as the refrigerant compressor still require power to maintain a comfortable environment within the cabin and sleeper of the vehicle.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present technology relates to reducing efficiency losses associated with powering vehicle accessories. In an aspect, the present technology relates to a system for driving an accessory of a vehicle. The system includes a power take-off (PTO) device, a mechanically driven accessory, a battery, and power conversion circuitry electrically connected to the battery. The system also includes a first electric motor mechanically coupled to the PTO device and electrically connected to the power conversion circuitry, and a second electric motor mechanically coupled to the mechanically driven accessory and electrically connected to at least one of the power conversion circuitry or the battery, wherein the second electric motor has a smaller power capacity than the first electric motor. The system further includes an engageable mechanical connector that, when engaged, mechanically couples the PTO device and the mechanically driven accessory. In addition, the system includes at least one processor; and memory storing instructions, that when executed by the at least one processor, cause the system to perform a set of operations. The set of operations include engaging the engageable mechanical connector when a speed of the PTO device is within a predetermined speed range; disengaging the engageable mechanical connector when the speed of the PTO device is outside the predetermined speed range; and based on disengaging the engageable mechanical connector, providing electric power, from at least one of the battery or the power conversion circuitry, to the second electric motor to cause the second electric motor to generate and transfer mechanical energy to the mechanically driven accessory.

In an example, the operations further include accessing a target speed range of the mechanically driven accessory, wherein the predetermined speed range is based on the target speed range. In another example, the engageable mechanical connector includes a clutch configured to engage and disengage the PTO device to and from at least one of the second electric motor or a set of gears coupled to the mechanically driven accessory. In a further example, the first electric motor is configured to generate electric power to recharge the battery. In yet another example, the mechanically driven accessory is a refrigerant compressor.

In another aspect, the present technology relates to a system for driving an accessory of a vehicle. The system includes a power take-off (PTO) device, a first electric motor, a second electric motor, wherein the second electric motor has a smaller power capacity than the first electric motor, and a clutch coupled to a shaft of the second electric motor and the PTO device. The clutch is configured to engage, such that the shaft of the second electric motor is coupled with the PTO device when a speed of the PTO device is within a predetermined speed range; and disengage, such that the shaft of the second electric motor is decoupled from the PTO device when a speed of the power take-off is outside the predetermined speed range.

In an example, the second electric motor is coupled to a mechanically driven accessory to mechanically couple the PTO device with the mechanically driven accessory when the clutch engages the shaft with the PTO device. In another example, the predetermined speed range of the power take-off is based on a target speed range for a mechanically driven accessory. In a further example, the first electric motor is configured to convert mechanical energy, transferred from the PTO device, to electric energy to charge a battery of the vehicle. In yet another example, the system further includes electric power conversion circuitry configured to transfer at least a portion of the electric energy produced by the first electric motor to the second electric motor when the shaft of the second electric motor is decoupled from the PTO device. In still another example, the first electric motor is further configured to crank an engine of the vehicle.

In another example, the present technology relates to a method for controlling mechanical power delivery to a mechanically driven accessory of a vehicle. The method includes receiving a first speed of a power take-off (PTO) device at a first time; comparing the first speed of the PTO device to a predetermined speed range; and based on the comparison of the first speed to the predetermined speed range, engaging a mechanical connection between an electric motor and the PTO device, wherein engaging the mechanical connection causes mechanical power to be transferred from the PTO device to a mechanically driven accessory. The method further includes receiving a second speed of the PTO device at a second time; comparing the second speed of the PTO device to the predetermined speed range; and based on the comparison of the second speed to the predetermined speed range: disengaging the mechanical connection between the electric motor and the PTO device; and applying electric power to the electric motor to generate mechanical power that is transferred to the mechanically driven accessory.

In an example, the predetermined speed range is based on a target speed range for driving the mechanically driven accessory. In another example, the second speed is higher than the first speed. In yet another example, the mechanically driven accessory is a refrigerant compressor.

In another aspect, the technology relates to a method for controlling mechanical power delivery to a mechanically driven accessory of a vehicle. The method includes receiving, by a first electric motor, mechanical power from a drivetrain of the vehicle; generating, by the first electric motor, electric power from the mechanical power; charging at least one battery of the vehicle with the electric power generated from the first electric motor; providing electric power from the at least one battery to a second electric motor of the vehicle; generating, by the second electric motor, mechanical power from the electric power provided by the at least one battery; and driving an accessory of the vehicle with the mechanical power generated from the second electric motor.

In an example, a power capacity of the second electric motor is smaller than a power capacity of the first electric motor. In another example, the accessory is refrigerant compressor for cooling an interior of the vehicle. In yet another example, the method further includes cranking, by the first electric motor, an engine of the vehicle. In still another example, generating the mechanical power by the second electric motor includes turning a shaft of the second electric motor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 6 depicts another example method for mechanically powering a vehicle accessory accordingly to present technology.

FIG. 7 depicts an example method for controlling mechanical power delivery to a mechanically driven accessory of a vehicle FIG. 8 depicts an example method for controlling battery charge levels of a vehicle.

DETAILED DESCRIPTION

As discussed above, accessories such as refrigerant compressors may be incorporated into or attached to a vehicle. Powering such accessories has traditionally been inefficient. For instance, in some systems, the vehicle engine must be running for the heating/cooling system to operate. In other systems where an electric motor is provided in the vehicle, the electric motor may be used to power the vehicle accessories. The size of that electric motor, however, leads either to inefficiencies in providing power to the drivetrain of the vehicle or inefficiencies in powering the vehicle accessories. For example, a smaller electric motor cannot produce enough torque or power to crank the engine or provide power to the drivetrain. In contrast, a larger electric motor that is better suited to crank the engine of the vehicle or provide power to the drivetrain has significant spin losses. For instance, a large 15 kilowatt (kW) electric motor has spin losses of approximately 160 Watts (W) at operating speed. Thus, to run that electric motor for 10 hours to power a refrigerant compressor while a driver is hoteling in the sleeper, 1.6 kWh of energy needs to be stored in batteries just to overcome the spin losses from the electric motor. Accordingly, additional batteries are required, which leads to additional weight of the vehicle. In addition, a vehicle accessory such as a refrigerant compressor requires substantially less power (e.g., 1-3 kW) than provided by the large electric motor, leading to additional efficiency losses.

The present technology provides for systems and methods that, in part, reduce those efficiency losses. To do so, examples of the present technology introduce a secondary electric motor that has a smaller power capacity than the primary large electric motor. The smaller secondary electric motor may be sized to more efficiently power the vehicle accessory. For instance, where a refrigerant compressor is the primary accessory that is to be powered, the secondary electric motor may have a power capacity between about 1-3 kW to correspond to the power requirements of the refrigerant compressor. The secondary motor and/or the vehicle accessory may be coupled to a power take-off (PTO) device of the vehicle that transfers mechanical power from the drivetrain of the vehicle. Thus, the vehicle accessory may then be mechanically driven from the power of the drivetrain in certain conditions or mechanically driven by the secondary electric motor from power stored in the battery in other conditions. Thus, the vehicle accessories may be powered more efficiently and the energy-storage requirements for the batteries of the vehicle may be reduced.

Figure 1:
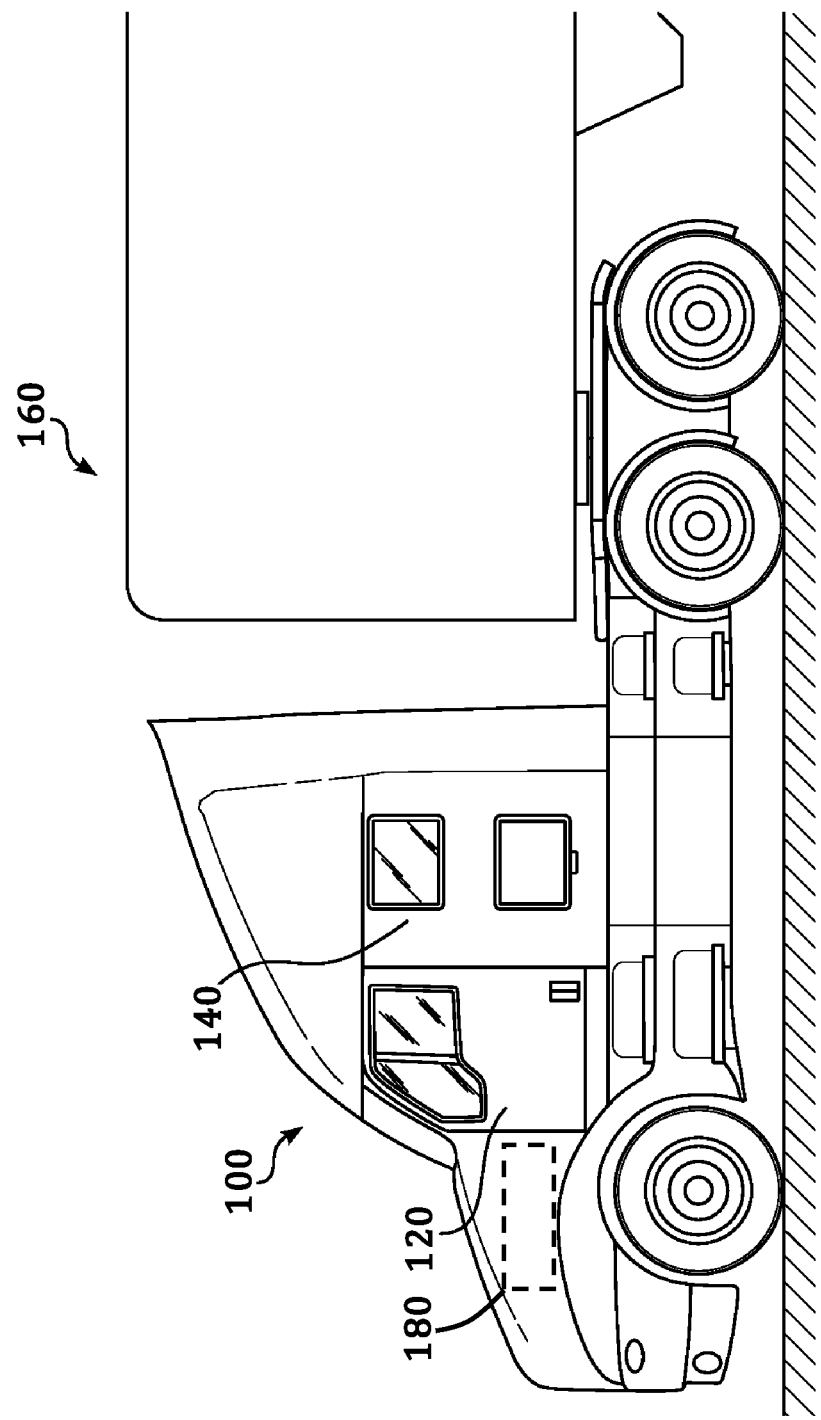
FIG. 1 depicts a side view of a vehicle.

FIG. 1 depicts a side view of a vehicle 100. In the example depicted, the vehicle 100 is a truck that is part of a tractor-trailer combination, which typically includes the tractor or truck having a so-called fifth wheel by which a box-like, flat-bed, or tanker semi-trailer 160 may be attached for transporting cargo or the like. While the vehicle 100 is depicted as a truck in FIG. 1, it should be appreciated that the present technology is applicable to any type of vehicle where powering a vehicle accessory is desired.

The example vehicle 100 includes a cabin 120 and an attached sleeper 140. The sleeper 140 may be equipped with a dedicated heating and cooling system to keep the driver comfortable in different climates. That dedicated heating and cooling system may include a vehicle accessory, such as the refrigerant compressor discussed herein. The vehicle 100 may also include an accessory-powering system 180 according to the present technology. The components and operations of example accessory-powering systems are discussed in further detail below.

Figure 2A:
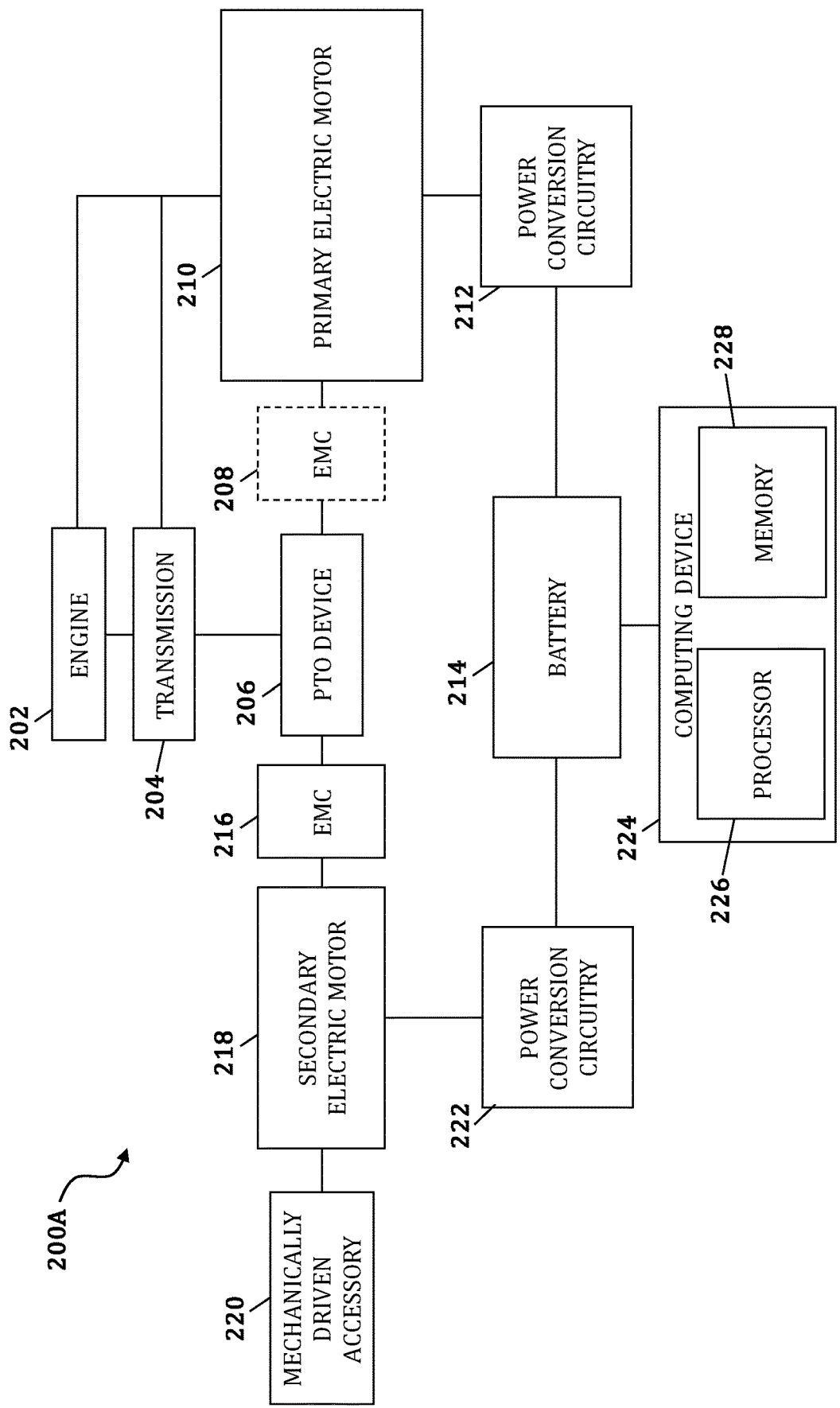
FIG. 2A depicts a schematic of an example system of the present technology utilizing a primary electric motor and a secondary electric motor.

FIG. 2A depicts a schematic of an example system 200A of the present technology utilizing a primary electric motor 210 and a secondary electric motor 218. The system 200A may be an example of an accessory-powering system 180 as depicted in FIG. 1. The system 200A includes an engine 202 that is coupled to a transmission 204. The engine 202 may be a combustion engine that provides mechanical power to the transmission 204, as will be appreciated by those having skill in the art. The transmission 204 is coupled to a PTO device 206. The coupling of the transmission 204 to the PTO device 206 may be accomplished directly or indirectly. In general, as used herein, the term "coupling" or "coupled" means that the two components are directly connected together or indirectly connected through one or more intervening components. The PTO device 206 is a device that allows for the mechanical power produced by the engine 202 to be transferred to another piece of equipment. The PTO device 206 effectively provides a coupling point for obtaining power from the drivetrain of the vehicle, which may be accomplished through a connection to the transmission 204 or another point on the drivetrain of the vehicle. For instance, the PTO device 206 may include a shaft, socket, plate, flange, or similar component that spins based on the speed of the drivetrain or transmission 204. Accordingly, additional devices may be attached to that spinning shaft or socket to transfer the mechanical power to another device. Those having skill in the art will appreciate the different types of PTO devices 206 that are known and commercially available.

The PTO device 206 may be coupled to a first engageable mechanical connector ("EMC") 208, which is in turn coupled to a first or primary electric motor 210. The first EMC 208 may be a clutch or other type of engageable gear that allows for the primary electric motor 210 to be selectively coupled to the PTO device 206. Accordingly, when the first EMC 208 is engaged and the engine 202 is running, mechanical power is transferred from the PTO device 206 to the primary electric motor 210. The primary electric motor 210 converts that mechanical power to electric power. When the first EMC 208 is disengaged or the engine 202 is not running, no mechanical power is transferred from the PTO device 206 to the primary electric motor 210. In some examples, the first EMC 208 may not be included in the system 200A, and the primary electric motor 210 may be permanently coupled to the PTO device 206.

In some examples, the primary electric motor 210 is a large electric motor that has a power capacity on the order of 10 kW or more. Other power capacities are also possible depending on the needs of the vehicle and uses of the primary electric motor 210. The primary electric motor 210 may be used for charging the batteries of the vehicle, such as battery 214, cranking the engine 202, and/or providing power back to the drivetrain of the vehicle through the transmission 204, among other possible functions. Thus, the primary electric motor 210 may be coupled to the transmission 204 to put power back into the drivetrain. The primary electric motor 210 may also be coupled to the engine 202 to crank the engine 202. In addition, the primary electric motor 210 may also be electrically connected to primary power conversion circuitry 212, which is in turn coupled to the battery 214.

The power conversion circuitry 212 may include power inversion and/or conversion circuitry to modify the electric power generated by the primary electric motor 210 when the first EMC 208 is engaged and the engine 202 is running. The primary power conversion circuitry 212 may invert direct current (DC) power to alternating current (AC) power or convert AC power to DC power depending on the type of electric power delivered from the primary electric motor 210. The primary power conversion circuitry 212 may also smooth or condition the electric power received from the primary electric motor 210. The primary power conversion circuitry 212 may also modify the voltage and/or current of the electric power from the primary electric motor 210 based on the input requirements for charging the battery 214.

Electric power may also be provided from the battery 214 to the primary electric motor 210. The electric power may be provided through the primary power conversion circuitry 212. In such operation, the primary power conversion circuitry 212 may effectively reverse the conversion of electric power that was performed when the electric power was provided from the primary electric motor 210 to the battery 214. For example, the primary power conversion circuitry 212 may invert DC power from the battery 214 to AC power if the primary electric motor 210 operates on AC power. The primary power conversion circuitry 212 may also modify the voltage and/or current of the electric power provided by the battery 214 based on the requirements or input specifications of the primary electric motor 210. The primary electric motor 210 then converts the received electric power to mechanical power that may be used to crank the engine 202 and/or provide power back to the drivetrain via the transmission 204. In such examples where the primary electric motor 210 is being used to generate mechanical power from electric power provided by the battery 214, the first EMC 208 may be disengaged. The secondary power conversion circuitry 222 may also include an electrically controlled switch, such as one or more transistors, relays, or similar devices. The electrically controlled switch allows for power to be selectively transferred to or from the primary electric motor 210 and the battery 214.

The PTO device 206 may also be coupled to a second or secondary electric motor 218 via a second EMC 216. The secondary electric motor 218 may have a lower power capacity than the primary electric motor 210. For example, the secondary electric motor 218 may have a power capacity of around 1-3 kW, whereas the primary electric motor 210 may have a power capacity of 10-15 kW. In some examples, the secondary electric motor 218 has a power capacity of less than about 75%, 50%, 25%, 15%, 10%, or 5% of the power of the power capacity of the primary electric motor 210.

Figure 3A:
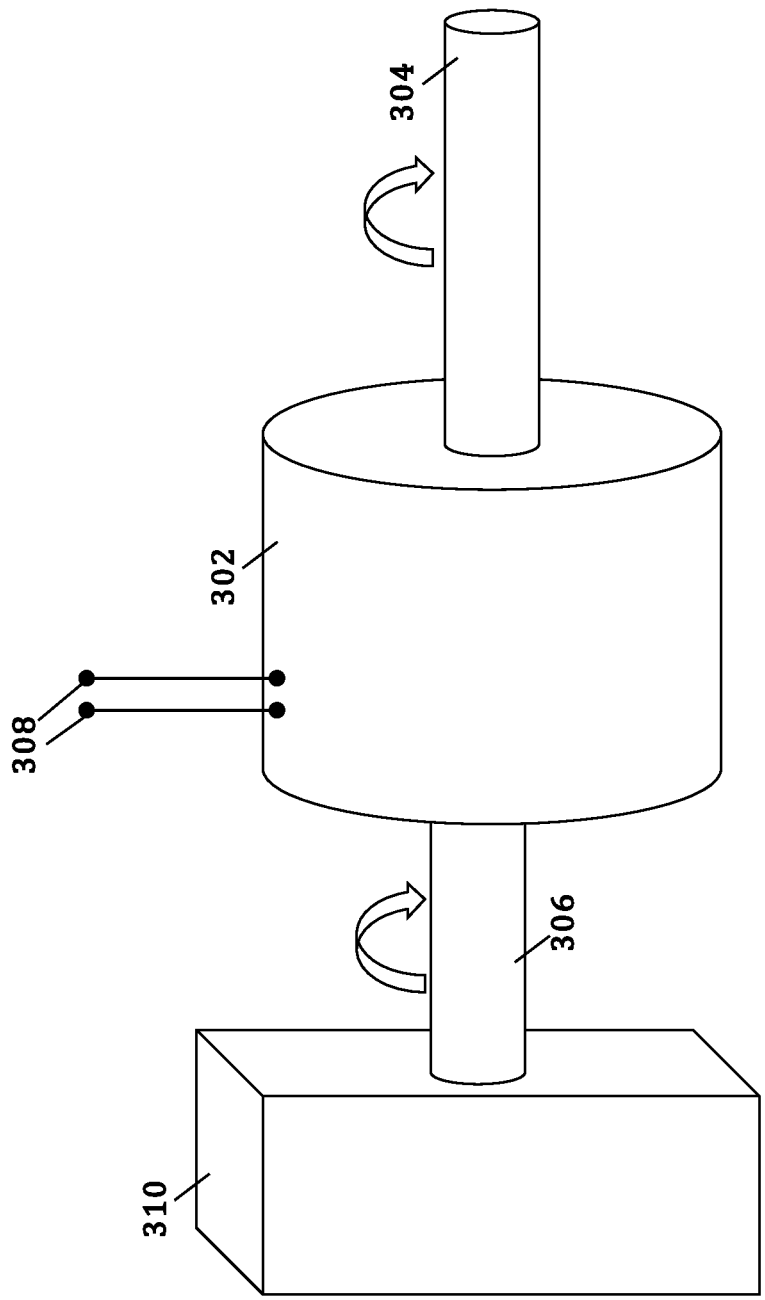
FIG. 3A depicts an example representation of a secondary electric motor coupled to a mechanically driven accessory.

The second EMC 216 may be a clutch or other type of engageable gear that allows for the secondary electric motor 218 to be selectively coupled to the PTO device 206. Accordingly, when the second EMC 216 is disengaged or the engine 202 is not running, no mechanical power is transferred from the PTO device 206 to the secondary electric motor 218. In contrast, when the second EMC 216 is engaged and the engine 202 is running, mechanical power is transferred from the PTO device 206 to the secondary electric motor 218. The secondary electric motor 218 may then transfer that mechanical power to a vehicle accessory, such as a mechanically driven accessory 220. The mechanically driven accessory 220 may be any accessory that may be operated based on mechanical power, such as refrigerant compressor, liquid or air pumps, pneumatic lift, air compressor, or other types of mechanically driven accessories. For instance, the secondary electric motor 218 may effectively mechanically couple the mechanically driven accessory 220 and the PTO device 206 when the second EMC 216 is engaged. As an example, the secondary electric motor 218 may be a dual-shafted electric motor where spinning of a first shaft of the secondary electric motor 218 causes the second shaft of the electric motor to spin. An example of such a configuration is depicted in FIG. 3A and discussed further below. The secondary electric motor 218 may also be mechanically coupled to additional accessories such that the secondary electric motor 218 may be used to power those additional accessories as well. In some examples, the primary electric motor 210 may also be mechanically coupled to the mechanically driven accessory 220 to power the mechanically driven accessory 220 if the load requirements of the mechanically driven accessory 220 exceeds the power capacity of the secondary electric motor 218.

The secondary electric motor 218 may also be electrically coupled to the battery 214. In some examples, when the EMC 216 is engaged and the engine 202 is running, the secondary electric motor 218 may convert at least a portion of the mechanical power transferred from the PTO device 206 into electric power that may be used to charge the battery 214. A secondary power conversion circuitry 222 may also be located between the secondary electric motor 218 and the battery 214. The secondary power conversion circuitry 222 may operate in substantially the same manner as the primary power conversion circuitry 212. For instance, the secondary power conversion circuitry 222 may modify voltage, current, AC, and/or DC properties of the electric power that is being provided from the secondary electric motor 218 to the battery 214 and/or electric power being provided from the battery 214 to the secondary electric motor 218. The secondary power conversion circuitry 222 may also include an electrically controlled switch, such as one or more transistors, relays, or similar devices. The electrically controlled switch allows for power to be selectively transferred to or from the secondary electric motor 218 and the battery 214. In some examples, secondary power conversion circuitry 222 may be combined with the primary power conversion circuitry 212 to have one combined set of circuitry for power conversion and modification of electric power to and from the primary electric motor 210 and the secondary electric motor 218.

When the engine 202 is not running or the speed of the PTO device 206 is not suitable for operating the mechanically driven accessory 220, the battery 214 may provide electric power to the secondary electric motor 218. The secondary electric motor 218 then converts that electric power to the mechanical power to mechanically drive the mechanically driven accessory 220. The amount of electric power provided to the secondary electric motor 218 may be based on the type of mechanically driven accessory 220 that is to be powered. For example, the mechanically driven accessory 220 may have a target speed for better performance of the mechanically driven accessory 220. The electric power provided from the battery 214 may then have characteristics, such as a particular voltage and/or current, that causes the secondary electric motor 218 to produce mechanical power at the target speed for the mechanically driven accessory 220.

The system 200A may also include a computing device 224 that is powered from the battery 214. The computing device 224 includes at least one processor 226 and memory 228. The memory 228 may comprise non-transitory computer storage media that stores instructions that, when executed by the at least one processor 226, causes the system 200A to perform a set of operations or processes described herein. The computing device 224 may be in communication with the power conversion circuitry 212 and the secondary power conversion circuitry 222 to control the electrically controlled switches and power modification components therein. Thus, execution of instructions may cause electric power to be transferred to the primary electric motor 210 and/or the secondary electric motor 218 by closing or opening the electrically controlled switches in the power conversion circuitry 212 and/or the secondary power conversion circuitry 222. For instance, the computing device 224 may send a close signal that causes the electrically controlled switches to close and an open signal that causes the electrically controlled switches to open. The computing device 224 may also be in communication with the first EMC 208 and/or the second EMC 216. Accordingly, execution of instructions may engage or disengage the first EMC 208 and/or the second EMC 216. For instance, the computing device 224 may send an engage signal to the first EMC 208 and/or the second EMC 216 that causes the first EMC 208 and/or second EMC 216 to engage. Similarly, the computing device 224 may send a disengage signal to the first EMC 208 and/or the second EMC 216 that causes the first EMC 208 and/or second EMC 216 to disengage. The computing device 224 may also be in communication with the engine 202 along with other powertrain and vehicle systems.

The at least one processor 226 is a hardware device or combination of hardware devices, such as one or more microprocessors, a multi-core processor, and/or or a central processing unit (CPU). Depending on the exact configuration and type of computing device 224, memory 228 may be non-transitory computer storage media that is volatile (such as RAM), non-volatile (such as ROM, flash memory, etc.), or some combination of the two. Further, memory 228 may also include storage devices (removable, and/or non-removable) including, but not limited to, solid-state, magnetic disks, optical disks, or tape. The computing device 224 may also have input and/or output devices such as a touchscreen, keyboard, mouse, pen, voice input, display, speakers, printer, etc. Communication connections may also be included in the computing device 224 that allow for further communication with a controller area network (CAN), local area network (LAN), wide area network (WAN), point-to-point, etc.

In addition, examples of the present technology may be practiced with or in an electrical circuit comprising discrete electronic elements, packaged or integrated electronic chips containing logic gates, a circuit utilizing a microprocessor, or on a single chip containing electronic elements or microprocessors that effectively operate as the computing device 224. For instance, the processor 224 and the memory 226 may be packaged together on a single chip or board. As an example, functionality of the present technology may be practiced via a system-on-a-chip (SOC) where each or many of the components the computing device 224 may be integrated onto a single integrated circuit. Such an SOC device may include one or more processors, graphics units, communications units, system virtualization units and various application functionality all of which are integrated onto the chip substrate as a single integrated circuit. When operating via an SOC, the functionality described herein may be operated via application-specific logic integrated with other components of the computing device 224 on the single integrated circuit (chip). Examples of the present disclosure may also be practiced using other technologies capable of performing logical operations such as, for example, AND, OR, and NOT, including but not limited to mechanical, optical, fluidic, and quantum technologies.

Figure 2B:
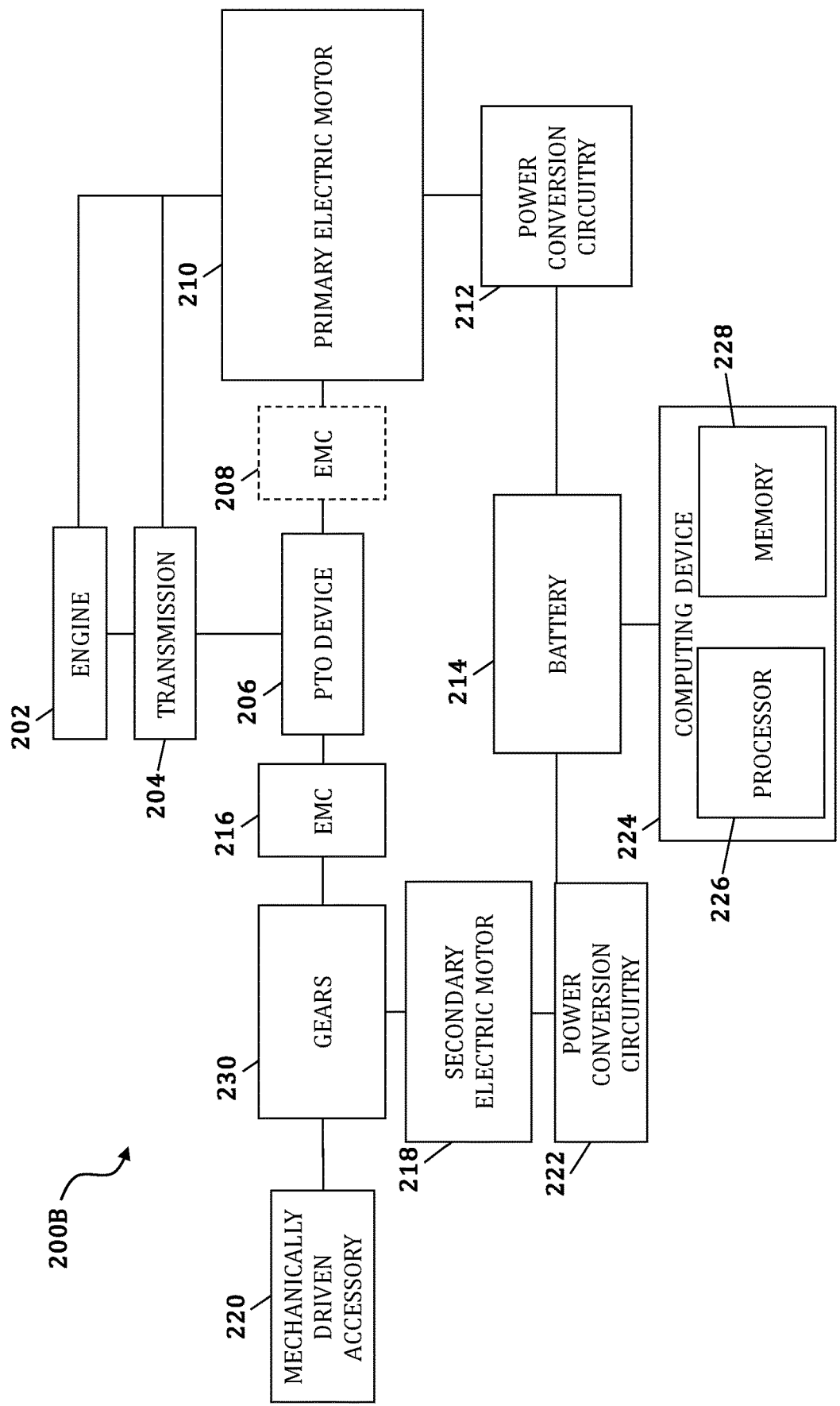
FIG. 2B depicts a schematic of another example system of the present technology utilizing a primary electric motor and a secondary electric motor.

FIG. 2B depicts a schematic of an example system 200B of the present technology utilizing a primary electric motor 210 and a secondary electric motor 218. System 200B is substantially similar to the system 200A depicted in FIG. 2A with the exception of the coupling mechanisms between the PTO device 206, the secondary electric motor 218, and the mechanically driven accessory. In system 200B, the PTO device 206 is coupled to the second EMC 216, which is coupled to a set of gears 230 or gearbox. The set of gears 230 is configured to transfer mechanical power from the PTO device 206 to the mechanically driven accessory and/or the secondary electric motor 218. Similarly, the set of gears 230 is configured to transfer mechanical power from the secondary electric motor to the mechanically driven accessory 220. The set of gears 230 may be a set of planetary gears, other gears, a chain drive, a belt and pulley system, or another similar system that allows for mechanical energy transfer between more than two devices or objects. An example of such a configuration is depicted in FIG. 3B and discussed further below.

FIG. 3A depicts an example representation of a secondary electric motor 302 coupled to a mechanically driven accessory 310 (such as mechanically driven accessory 220 in FIG. 2A). Such a coupling may be used in system 200A depicted in FIG. 2A and discussed above. The secondary electric motor 302 has a first shaft 304 and a second shaft 306. The secondary electric motor 302 also includes terminals or connectors 308 for transferring or receiving electric power. In the example depicted, when mechanical power is received at the first shaft 304, such as from a PTO device, the first shaft 304 spins, which also causes the second shaft 306 to spin. In some examples, the first shaft 304 and the second shaft 306 may be part of the same shaft, such as a through-shaft that passes through the secondary electric motor 302. The second shaft 306 is coupled to the mechanically driven accessory 310 such that the mechanical power from the spinning second shaft 306 may be transferred to the mechanically driven accessory.

When mechanical power is applied to the first shaft 304 that causes the first shaft 304 to spin, the secondary electric motor 302 may convert at least a portion of that mechanical power to electric power. The electric power may be transferred to a battery via connectors 308. The connectors 308 may also be used to receive electric power from the battery. When electric power is received from the battery, the secondary electric motor 302 generates mechanical power that causes at least the second shaft 306 to spin. The spinning second shaft 306, which is coupled to the mechanically driven accessory 310, transfers the mechanical power to the mechanically driven accessory 310. Components in addition to those shown in the simplified representation depicted in FIG. 3A may also be included.

Figure 3B:
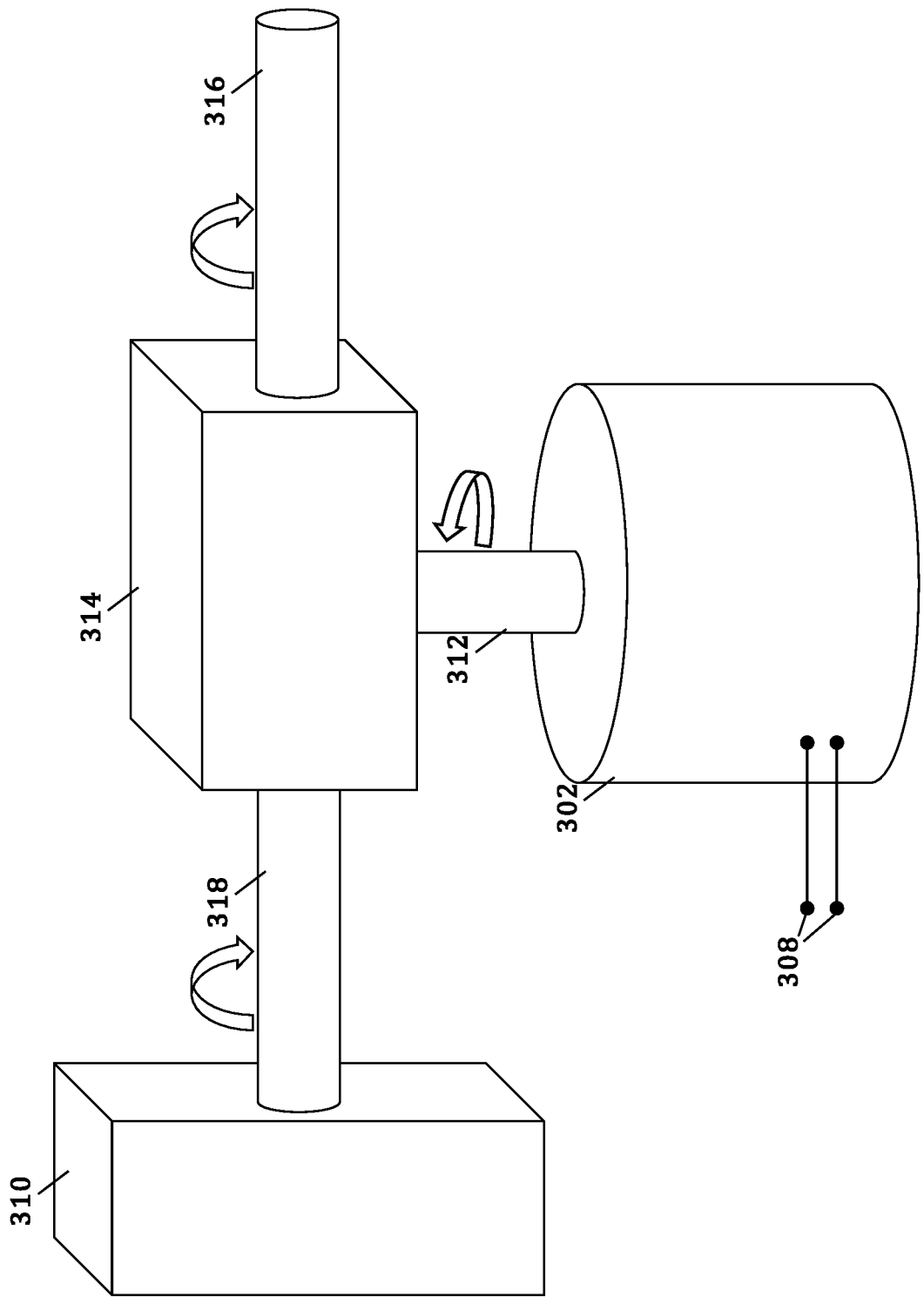
FIG. 3B depicts another example representation of a secondary electric motor coupled to a mechanically driven accessory.

FIG. 3B depicts another example representation of a secondary electric motor 302 coupled to a mechanically driven accessory 310 (such as mechanically driven accessory 220 in FIG. 2B). Such a coupling may be used in system 200B depicted in FIG. 2B and discussed above. The secondary electric motor 302 has a shaft 312 that is coupled to a set of gears 314. Another input shaft 316 is also coupled to the set of gears 314. The input shaft 316 may be coupled to a PTO device. The mechanically driven accessory 310 is coupled to the set of the gears 314 via an output shaft 318. When the input shaft 316 spins, such as when mechanical power is transferred from the PTO device, the output shaft 318 also spins. In some examples, spinning of the input shaft 316 also causes the shaft 312 of the secondary electric motor 302. When spinning of the input shaft 316 causes the shaft 312 to spin, the secondary electric motor 302 may convert the mechanical power to electric power and transfer that electric power via the connectors 308.

Electric power may also be provided to the secondary electric motor 302 via the connectors 308. When electric power is provided or applied to the secondary electric motor 302, the secondary electric motor 302 converts that electric power to mechanical power that causes the shaft 312 to spin. The set of gears 314 transfers the mechanical power of the shaft 312 to the output shaft 318, causing the output shaft 318 to spin. The spinning output shaft 318 then powers the mechanically driven accessory 310. Accordingly, the mechanically driven accessory 310 may be driven from mechanical power from the PTO device or mechanical power generated from the secondary electric motor 302. Components in addition to those shown in the simplified representation depicted in FIG. 3B may also be included.

Figure 4A:
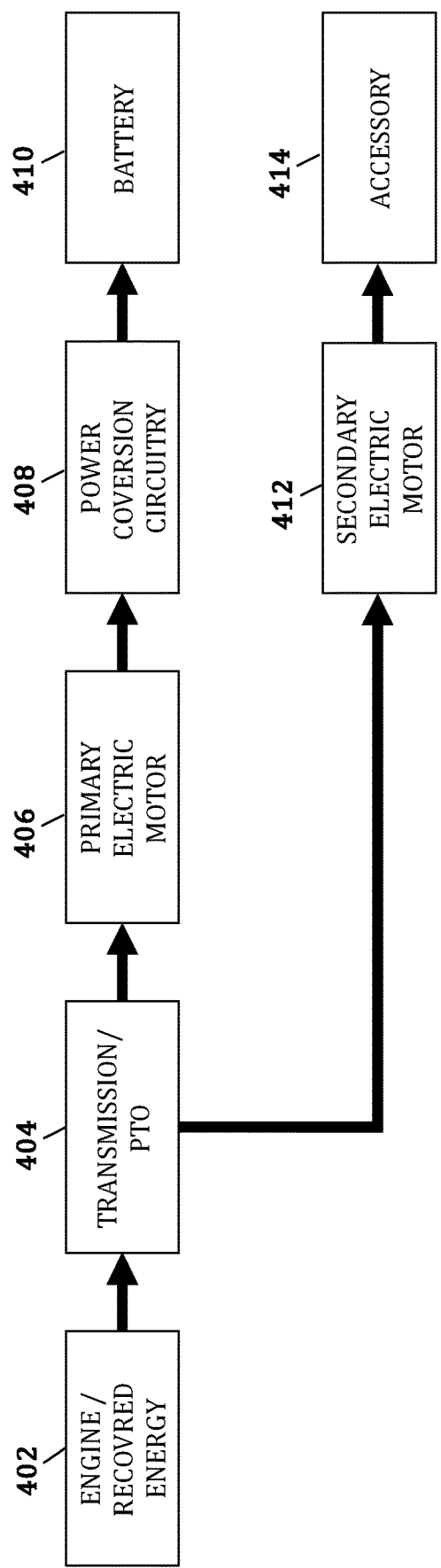
FIG. 4A depicts a power flow representation according to an example of the present technology.
Figure 4B:
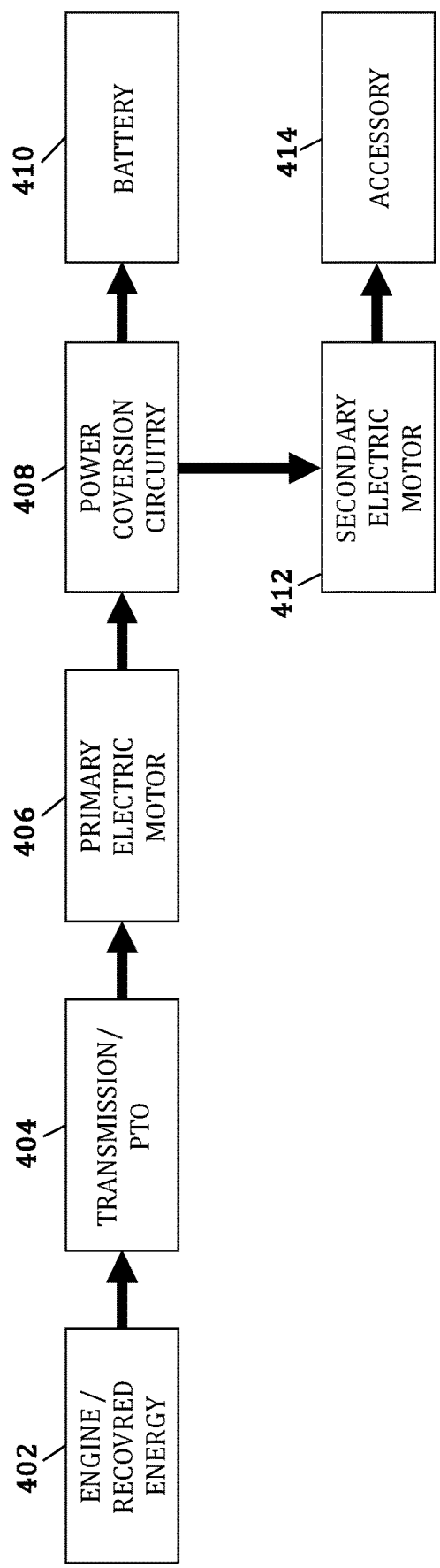
FIG. 4B depicts another power flow representation according to an example of the present technology.
Figure 4C:
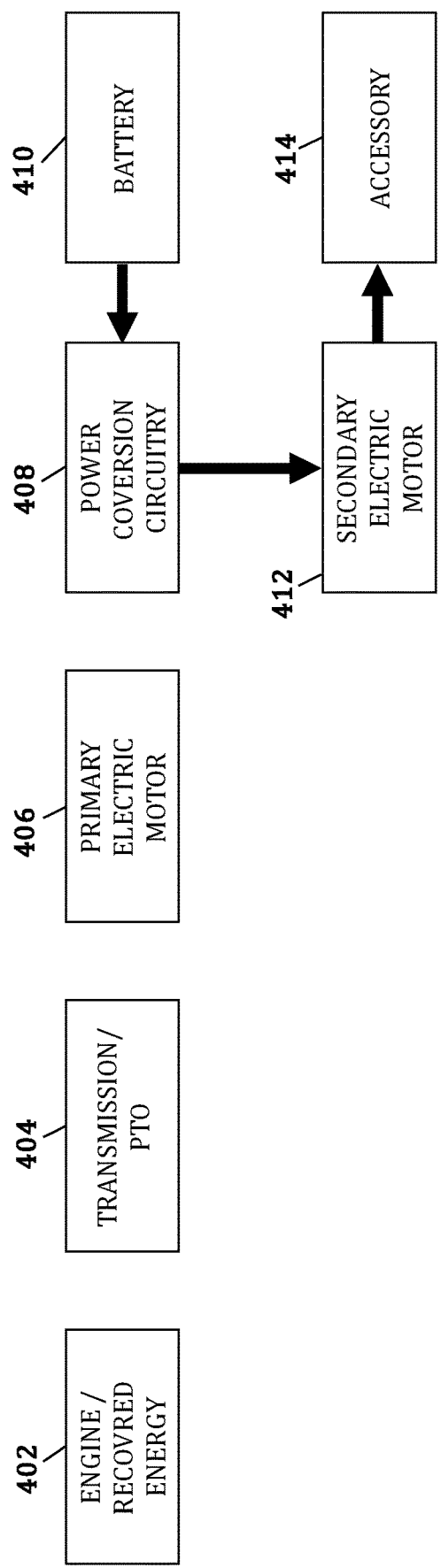
FIG. 4C depicts another power flow representation according to an example of the present technology.

FIGS. 4A-4C depict different power flow representations based on the operating conditions of the vehicle. In examples, the power flow representations of FIGS. 4A-4C represent power flow between and among elements of systems such as those depicted in FIGS. 2A and 2B. As discussed above, the PTO device 404 generally includes a spinning shaft, socket, plate, flange, or similar connection device. The PTO device 404 may spin at different speeds, as measured in rotations per minute (RPM) for example. The speed of the PTO device 404 may be largely based on the engine speed and/or the speed of the vehicle. For instance, when the engine 402 is running at a high speed, the speed of the PTO device 404 is also high. As another example, if a vehicle is descending a grade using an engine brake or a "Jake" brake, the engine speed also increases, which causes the PTO device 404 to operate at a higher speed. In contrast, if the vehicle is ascending a lengthy grade with the transmission in a lower gear, the engine may be operating a lower speed (e.g., 1500-2000 rpm) and thus the PTO device 404 operates at a lower speed. Some speed ranges of the PTO device 404 are acceptable for mechanically powering the accessory, while other speed ranges may be unacceptable. The speed ranges may be based on the type of accessory that is being operated and the target speed ranges of those accessories. In addition, one or more gears (such as gears 230 in FIG. 2B), or other means of transmitting mechanical power, may be present between the PTO device 404 and the accessory 414 that either step up or step down the speed from the PTO device 404 to the accessory 414.

FIG. 4A depicts a power flow representation for an operating condition of the vehicle where the speed of the PTO device 404 is within a range that is acceptable to power the mechanically driven accessory 414. In the power flow representation of FIG. 4A, mechanical power is transferred from the engine 402 to the transmission and the PTO device 404. The mechanical power may be generated from combustion of fuel by the engine 402 or through recovered energy, such as when the vehicle is descending a grade. The mechanical power is then transferred from the PTO device 404 to the primary electric motor 406 and the secondary electric motor 412. The secondary electric motor 412 transfers the mechanical power to the mechanically driven accessory 414. For example, the secondary electric motor 412 mechanically couples the PTO device 404 and the mechanically driven accessory 414. In such an example, a second EMC (such as EMC 216 discussed above in FIG. 2A) is engaged to allow for the secondary electric motor 412 to be coupled to the PTO device 404.

The primary electric motor 406 converts the mechanical power to electric power and transfers the electric power to the power conversion circuitry 408. The power conversion circuitry modifies the electric power and transfers the modified electric power to the battery 410 to charge the battery 410.

FIG. 4B depicts another power flow representation for an operating condition of the vehicle where the speed of the PTO device 404 is within a range that is unacceptable to power the mechanically driven accessory 414. For example, the engine 402 speed (and thus the PTO device 404 speed) may be too high to safely or properly power the accessory 414. In such an operating condition, the secondary electric motor 412 is decoupled from the PTO device 404, such as by disengaging the second EMC discussed above in the example system of FIG. 2A.

In the power flow depicted in FIG. 4B, mechanical power from the engine 402 is transferred to the transmission and the PTO device 404. The mechanical power is then transferred from the PTO device 404 to the primary electric motor 406. The primary electric motor 406 converts the mechanical power to electric power and transfers that electric power to the power conversion circuitry 408. The power conversion circuitry 408 modifies the electric power and may transfer a portion of the electric power to the battery 410 to charge the battery 410.

The power conversion circuitry 408 may also transfer a portion of the electric power to the secondary electric motor 412. The secondary electric motor 412 converts the electric power into mechanical power that causes a shaft of the secondary electric motor 412 to spin. That mechanical power is transferred to the accessory 414 to power or drive the accessory 414. The power conversion circuitry 408 may modify the electric power to have voltage and current characteristics appropriate for the secondary electric motor 412 and to cause the secondary electric motor 412 to spin at a speed that is within the target speed range for the accessory 414.

FIG. 4C depicts another power flow representation for an operating condition of the vehicle where engine 402 is not running. Such an operating condition may occur when a driver of the vehicle is hoteling. In such an example, electric energy is transferred from the battery 410 to the power conversion circuitry 408. The power conversion circuitry 408 modifies the electric power and provides it to the secondary electric motor 412. The secondary electric motor 412 converts the electric power to mechanical power and transfers that mechanical power to the accessory 414. The power conversion circuitry 408 may modify the electric power to have voltage and current characteristics appropriate for the secondary electric motor 412 and to cause the secondary electric motor 412 to spin at a speed that is within the target speed range for the accessory 414. In some examples, if the load required by the accessory 414 exceeds a threshold that can be provided by the battery 410 or the electric energy stored in the battery 410 drops below a threshold, the engine may be started to recharge the battery 410 and/or provide mechanical power to the accessory 414, such as depicted in the power flow in FIG. 4A.

Figure 5:
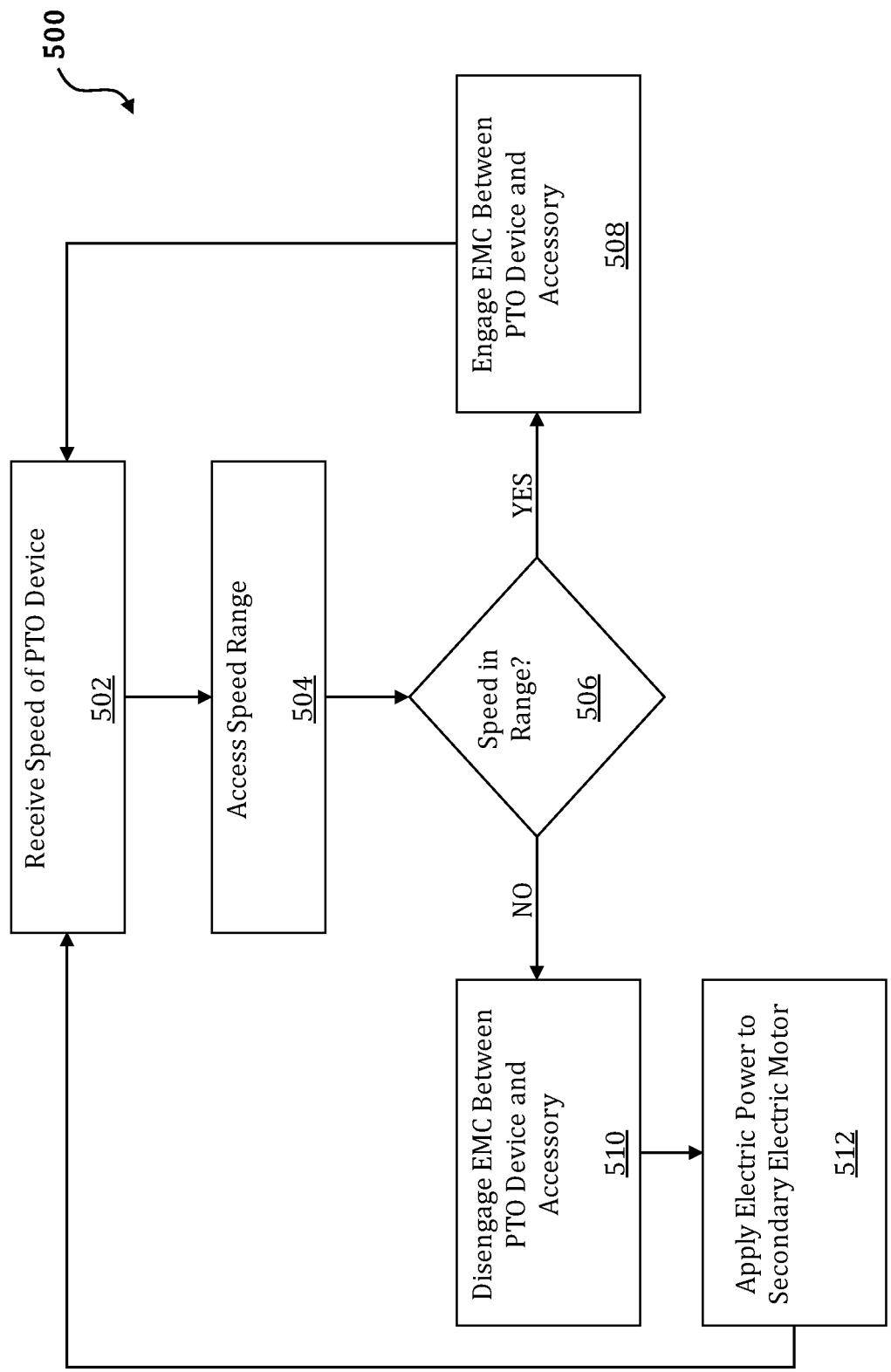
FIG. 5 depicts an example method for mechanically powering a vehicle accessory accordingly to present technology.

FIGS. 5-7 depict example methods according to the present technology herein. The example methods include operations that may be implemented or performed by the systems and devices disclosed herein. For example, the system 200A depicted in FIG. 2A and/or system 200B depicted in FIG. 2B may perform the operations described in the methods. For example, the computing device 224 in system 200A and system 200B may perform the operations disclosed herein. In addition, instructions for performing the operations of the methods disclosed herein may be stored in the memory 228 of computing device 224.

FIG. 5 depicts an example method 500 for controlling mechanical power delivery to a mechanically driven accessory of a vehicle according to the present technology. The method 500 may be executed when a request to power a vehicle accessory is received, such as by a selection from a user. The request to power the vehicle accessory may also be from an automatic switch, such as a switch that triggers based on temperature in the cabin and/or sleeper. At operation 502, a speed of a PTO device is received or accessed. The speed of the PTO device may be measured from the variety of sensors capable of measuring rotation speed, such as tachometers, as will be appreciated by those having skill in the art. In some examples, the speed of the PTO device may also be derived or calculated from the transmission speed or engine speed, which may be measured by a tachometer of the vehicle. Such sensors may be in communication with a computing device, such as computing device 224 depicted in FIGS. 2A-2B, to allow for the computing device to access or receive the speeds measured by the sensors.

At operation 504, a speed range is accessed. The speed range may be a target range for the particular vehicle accessory that is to be mechanically powered. For example, the target range may be a range of rotation speeds that are acceptable to power the accessory. As an example, when a vehicle accessory is connected to the vehicle, the vehicle accessory may be automatically identified, and a target speed for the identified accessory may be accessed. Target speeds for multiple different accessories may be stored in memory of the computing device and accessed as needed. In other examples, target speeds for an identified accessory may be accessed from a remote source, such as via the Internet. In some examples, the type of accessory may be manually selected or entered by a user. The target speed for the selected accessory may then be accessed. Further, the speed range may be entered manually by a user. That manually entered speed range may then be accessed. Thus, the speed range may be preset or predetermined before the vehicle accessory is powered by the vehicle.

At operation 506, a comparison is made between the speed of the PTO device received in operation 502 and the speed range accessed in operation 506. If the received speed of the PTO device is within the accessed speed range, the PTO speed is appropriate to mechanically power the vehicle accessory, and method 500 flows to operation 508. At operation 508, an EMC between the PTO device and the secondary electric motor is engaged (or remains engaged) such that mechanical energy is transferred to the accessory. Engaging the EMC may include generating, by a computing device, an engage signal that is transmitted to the EMC, which causes the EMC to engage. Engaging the EMC causes mechanical power to be transferred to a set of gears and/or to a secondary electric motor that mechanically couples the accessory and the PTO device. The method 500 then flows back to operation 502 where the method repeats. Accordingly, the speed of the PTO device may be continuously or periodically measured or received and compared to the speed range for the accessory to determine whether the current speed of the PTO device is acceptable for mechanically powering the vehicle accessory.

If, at operation 506, the received speed of the PTO device is outside of the accessed speed range, the speed of the PTO device is unacceptable for mechanically powering the vehicle accessory and method 500 flows to operation 510 where the EMC between the PTO device and the accessory is disengaged (or remains disengaged if previously disengaged). Disengaging the EMC may include generating, by a computing device, a disengage signal that is transmitted to the EMC, which causes the EMC to disengage. Disengaging the EMC decouples the PTO device from the accessory.

With the EMC disengaged, electric power is then provided or applied to the secondary electric motor at operation 512. The secondary electric motor uses that electric power to generate mechanical power that drives or powers the accessory. The electric power may be provided to the secondary electric motor from a battery, similar to the power flow representation shown in FIG. 4C. Providing the electric power from the battery may occur when the PTO speed is below the accessed speed range, such as when the engine is not running. The electric power may also, or alternatively, be provided to the secondary electric motor from electric power generated by the primary electric motor, similar to the power flow representation shown in FIG. 4B. For example, the electric power may be provided from the primary electric motor via the power conversion circuitry when the speed of the PTO device is higher than the accessed speed range. Applying or providing electrical power may include generating, by a computing device, a signal to close an electrically controlled switch between the source of the electric power and the secondary electric motor. The method 500 then flows back to operation 502 where the method 500 repeats.

FIG. 6 depicts another example method 600 for controlling mechanical power delivery to a mechanically driven accessory of a vehicle according to an example of the present technology. At operation 602, a first speed of a PTO device is received or accessed. The first speed of the PTO device corresponds to the speed of the PTO device at first point in time. At operation 604, the first speed of the PTO device is compared to a speed range. The speed range may be any of the speed ranges discussed herein. At operation 606, based on the comparison of the first speed of the PTO device and the speed range, a mechanical connection is engaged between either the PTO device and the secondary electric motor or the PTO device and a set of gears. Either the secondary electric motor or the set of gears mechanically couples the PTO device and the vehicle accessory when the mechanical connection is engaged.

At operation 608, a second speed of the PTO device is received or accessed. The second speed of the PTO device corresponds to the speed of the PTO device at a second point in time. At operation 610, the second speed of the PTO device is compared to the speed range. Based on the comparison of the second speed of the PTO device and the speed range, the mechanical connection between the PTO device and the accessory is disengaged in operation 612. Operation 612 may also include applying electric power to the secondary electric motor, which generates mechanical power to drive or power the accessory. In an example, the second speed of the PTO device is higher than the first speed of the PTO device, thus causing the second speed to be above the speed range.

FIG. 7 depicts another example method 700 for controlling mechanical power delivery to a mechanically driven accessory of a vehicle according to an example of the present technology. At operation 702, mechanical power from a drivetrain of a vehicle is received by a first electric motor. The first electric motor may be the primary electric motor discussed above. The mechanical power may be transferred from a PTO device. At operation 704, the first electric motor generates electric power from the received mechanical power. For example, the mechanical power may be received by the first electric motor in the form of spinning the shaft of the first electric motor. Spinning of the shaft of the first electric motor causes the first electric motor to generate electric power. The electric power generated by the first electric motor is then used to charge a battery of the vehicle in operation 706.

At operation 708, electric power is provided from the battery to a second electric motor of the vehicle. The second electric motor may be the secondary electric motor described herein and may have a power capacity less than that of the first electric motor. The electric power may be provided based on detection or determination that a speed of a PTO device is outside a speed range of a vehicle accessory. For example, a computing device may monitor the speed of the PTO device and compare the speed of the PTO device to a speed range for the accessory. If the speed of the PTO device is outside the range for the accessory, the computing device may cause the electric power to be provided in operation 708. At operation 710, the second electric motor then generates mechanical power from the electric power received from the battery. The generation of mechanical power may include turning or spinning a shaft of the second electric motor. At operation 712, the accessory of the vehicle is driven or powered with the mechanical power generated from the second electric motor.

In some examples, method 700 may also include providing electric power from the battery to the first electric motor. The first electric motor converts the received electric power into mechanical energy that may be used to crank the engine of the vehicle or provide power back to the drivetrain of the vehicle. In additional examples, the first electric motor may also convert the received electric power into mechanical energy that may be used to power the mechanically driven accessory.

FIG. 8 depicts an example method 800 for controlling battery charge levels of a vehicle. At operation 802, an EMC between the PTO device and the first electric motor of a vehicle may be engaged. Engagement of the EMC causes mechanical power to be transferred from the PTO device to the first electric motor. Engaging the EMC may include generating, by a computing device, an engage signal that is transmitted to the EMC, which causes the EMC to engage. At operation 804, the first electric motor generates electric power from the mechanical energy transferred from the PTO device. At operation 806, a battery of the vehicle is charged with the electric power generated from the first electric motor in operation 804.

At operation 808, a determination is made as to whether the battery is fully charged. Determining whether a battery is fully charged may be performed by measuring the voltage level of the battery. If the voltage level of the battery is at the rated or maximum voltage level for the battery, then the battery is fully charged. Accordingly, the determination operation may include measuring a voltage level of the battery and comparing the measured voltage level to a reference or maximum voltage level for the battery.

If a determination is made in operation 808 that the battery is not fully charged, the method 800 flows back to operation 802 where the EMC remains engaged and electric power continues to be generated to further charge the battery. If, however, a determination is made in operation 808 that the battery is fully charged, the method 800 flow to operation 810 where the EMC between the PTO device and the first electric motor is disengaged. Disengaging the EMC may include generating, by a computing device, a disengage signal that is transmitted to the EMC, which causes the EMC to disengage. By disengaging the EMC, the transfer of mechanical power from the PTO device to the first electric motor is ceased. Thus, no additional electric power is generated and the battery is not further charged even though the engine of the vehicle may still be running. Therefore, overcharging of the battery and the negative outcomes associated therewith may be substantially prevented.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. One skilled in the art will recognize other embodiments or improvements that are within the scope and spirit of the present technology. In addition, one having skill in the art will recognize that the various examples and embodiments described herein may be combined with one another. Therefore, the specific structure, acts, or media are disclosed only as illustrative embodiments. The scope of the technology is defined by the following claims and any equivalents therein.

What is claimed is:

1. A system for driving an accessory of a vehicle, the system comprising:
    a power take-off (PTO) device;
    a mechanically driven accessory;
    a first electric motor mechanically coupled to the PTO device;
    a second electric motor mechanically coupled to the mechanically driven accessory;
    a first engageable mechanical connector that, when engaged, mechanically couples the PTO device and the mechanically driven accessory;
    at least one processor; and
    memory storing instructions, that when executed by the at least one processor, cause the system to perform a set of operations comprising:
        engaging the first engageable mechanical connector when a speed of the PTO device is within a predetermined speed range;
        disengaging the first engageable mechanical connector when the speed of the PTO device is outside the predetermined speed range; and
        based on disengaging the first engageable mechanical connector, providing electric power to the second electric motor to cause the second electric motor to generate and transfer mechanical energy to the mechanically driven accessory.

2. The system of claim 1, further comprising an additional mechanically driven accessory, wherein the second electric motor is mechanically coupled to the additional mechanically driven accessory.

3. The system of claim 1, wherein the first electric motor is mechanically coupled to the mechanically driven accessory.

4. The system of claim 3, wherein each of the first electric motor and the second electric motor have a power capacity;
    wherein the power capacity of the first electric motor is different from the power capacity of the second electric motor; and
    wherein the mechanically driven accessory is driven selectively by either the first electric motor or the second electric motor according load requirements of the mechanically driven accessory.

5. The system of claim 4, wherein the power capacity of the first electric motor exceeds the power capacity of the second electric motor and mechanically driven accessory is selectively driven by the first electric motor when the load requirements of the mechanically driven accessory exceed the power capacity of the second electric motor.

6. The system of claim 1, wherein the second electric motor is sized to correspond to power requirements of the mechanically driven accessory.

7. The system of claim 1, further comprising a second engageable mechanical connector that, when engaged, mechanically couples the PTO device and the first electric motor.

8. The system of claim 7, wherein the second engageable mechanical connector is configured to engage and disengage the PTO device to and from the first electric motor according to operation of the first electric motor.

9. The system of claim 7, wherein the second engageable mechanical connector is configured to engage and disengage the PTO device to and from the first electric motor according to a determination that a battery of the vehicle is fully charged.

10. The system of claim 9, further comprising a computing device, wherein the computing system performs the determination that the battery is fully charged.

11. The system of claim 10, further comprising power conversion circuitry in communication with the computing device, wherein the computing device communicates with the system via the power conversion circuitry.

12. The method of claim 9, wherein the determination the battery is fully charged comprises measuring a voltage level of the battery and comparing the measured voltage level to a reference voltage level for the battery.

13. A system for driving an accessory of a vehicle, the system comprising:
    a power take-off (PTO) device,
    a first electric motor;

a second electric motor; and a clutch coupled to a shaft of the second electric motor and the PTO device, wherein the clutch is configured to:

engage, such that the shaft of the second electric motor is coupled with the PTO device when a speed of the PTO device is within a predetermined speed range; and disengage, such that the shaft of the second electric motor is decoupled from the PTO device when a speed of the power take-off is outside the predetermined speed range.

14. The system of claim 13, wherein the second electric motor is coupled to a mechanically driven accessory to mechanically couple the PTO device with the mechanically driven accessory when the clutch engages the shaft with the PTO device.

15. The system of claim 14, wherein the first electric motor is mechanically coupled to the mechanically driven accessory.

16. The system of claim 15, wherein each of the first electric motor and the second electric motor have a power capacity;

wherein the power capacity of the first electric motor is different from the power capacity of the second electric motor; and wherein the mechanically driven accessory is driven selectively by either the first electric motor or the second electric motor according load requirements of the mechanically driven accessory.

17. The system of claim 13, further comprising a computing device configured to control engagement and disengagement of the clutch according to the predetermined speed range.

18. The system of claim 17, further comprising power conversion circuitry in communication with the computing device, wherein the computing device operates the clutch via the power conversion circuitry.

19. The system of claim 13, wherein the instructions to be executed by the processor such that the system is further configured to:

identify the mechanically driven accessory; and determine an appropriate predetermined speed range according to the identification of the mechanically driven accessory.

20. A system for controlling mechanical power delivery to a mechanically driven accessory of a vehicle, the system comprising:

at least one processor;

a memory including instructions to be executed by the at least one processor such that the system is configured to:

receive a first speed of a power take-off (PTO) device at a first time;

compare the first speed of the PTO device to a predetermined speed range;

based on the comparison of the first speed to the predetermined speed range, send an engage signal to a mechanical connection between an electric motor and the PTO device, wherein engaging the mechanical connection causes mechanical power to be transferred from the PTO device to a mechanically driven accessory;

receive a second speed of the PTO device at a second time;

compare the second speed of the PTO device to the predetermined speed range;

based on the comparison of the second speed to the predetermined speed range:

send a disengage signal to the mechanical connection between the electric motor and the PTO device; and send a signal to the electric motor to generate mechanical power that is transferred to the mechanically driven accessory.

* * * * *